Dec. 9, 1969   J. R. GUMP   3,482,932

PROCESS FOR SEPARATING YTTRIUM FROM THE LANTHANIDE ELEMENTS

Filed Feb. 5, 1968

INVENTOR.
J. R. GUMP
BY
Cyril A. Krenzer
ATTORNEY

United States Patent Office 3,482,932
Patented Dec. 9, 1969

3,482,932
PROCESS FOR SEPARATING YTTRIUM FROM THE LANTHANIDE ELEMENTS
J. R. Gump, Alma, Mich., assignor to Sylvania Electric Products Inc., a corporation of Delaware
Filed Feb. 5, 1968, Ser. No. 703,027
Int. Cl. C22b 59/00; C07f 9/08
U.S. Cl. 23—22      4 Claims

ABSTRACT OF THE DISCLOSURE

Yttrium and the heavier rare earth elements of the lanthanide series are separated from the lighter rare earth elements by means of a solvent extraction process using a mixture of monoesters and diesters of tridecyl orthophosphoric acid as the active organic reagent and a nitrate system for the aqueous phase. The yttrium and heavy rare earth elements recovered from the organic phase of the solvent extraction process are then passed through an ion exchange system where yttrium is separated from the heavy rare earths.

BACKGROUND OF THE INVENTION

The uses and subsequent demands for compounds of yttrium and elements of the lanthanide series, the so-called rare earth elements, have increased significantly in recent years. In particular, purified yttrium oxide and yttrium compounds find extensive utility in phosphors for color cathode ray tubes, in lighting products and increasing utility in electronics and related equipment. As a result, the present demand for yttrium runs into hundreds of thousands of pounds a year. Furthermore, as the cost of obtaining the yttrium is reduced, it is expected that even greater utility will result.

Yttrium and the rare earth elments occur together in nature and have highly similar chemical characteristics, making it difficult to effectively separate the various elements using conventional techniques. One technique that has been used successfully to separate yttrium from the rare earths is a two-cycle ion exchange process wherein the first cycle uses elution through a HEDTA solution to remove the heavy and middle rare earths and in the second cycle this remaining elements are eluted through an EDTA solution for separation of the yttrium from the remaining rare earths. While this yields relatively pure yttrium, it is quite time-consuming, possibly requiring 45 to 60 days, and is inherently expensive especially when considering the investment in the plant and equipment, the resin for the columns and the in-process inventory.

The solvent extraction process has also been used to separate yttrium from the rare earths. However, the solvent extraction process is not especially efficient in the recovery of the yttrium, as compared with ion exchange techniques. In addition, it is relatively difficult to obtain the desired purity using a solvent extraction process.

OBJECTS AND SUMMARY OF THE INVENTION

It is an object of this invention to provide an improved method for separating yttrium from elements of the lanthanide series.

A further object of this invention is to provide an improved method for separating yttrium from elements of the lanthanide series which requires a minimum amount of time.

Still another object of this invention is to provide an improved, simplified method for separating yttrium from elements of the lanthanide series which is economical in operation.

According to one aspect of the invention, a solvent extraction process is first used to separate the lighter elements of the lanthanide series into an aqueous phase and the heavier elements of the lanthanide series including yttrium into the organic phase in a manner such that neodymium content of the organic phase is 0.02% or less. The heavy fraction including yttrium recovered from the organic phase of the solvent extraction process is then passed through an ion exchange system using HEDTA as the eluting agent to effect separation of yttrium from the heavier elements of the lanthanide series.

DESCRIPTION OF THE PREFERRED EMBODIMENTS

Figure 2:
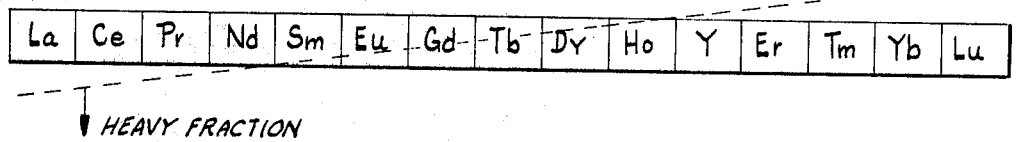
FIG. 2 is a diagram illustrating the cut desired to be made in the process of FIG. 1.

In carrying out the process of the invention, an aqueous feed having a suitable concentration of yttrium and rare earth oxides in nitric acid solution is prepared for the solvent extraction portion of the process. The organic phase consists of monoesters and diesters of tridecyl orthophosphoric acid in solution with a suitable carrier and, if necessary, a co-carrier. This part of the system is a counter-current liquid-liquid process utilizing mixer-settler units in which yytrium and the heavier rare earths are taken into the organic phase and the lighter rare earths remain in the aqueous phase. As seen in FIG. 2, some of the intermediate rare earths will exist in both the organic and aqueous phases. For reasons which will become apparent, it is necessary that the heavy/light cut be made so that the heavy fraction contains no more and preferably less than 0.02% neodymium. Therefore, the organic phase must exhibit the proper selectivity and, of course, must readily release the heavy fraction it extracts. Following the extraction stages, the light fraction may be precipitated out with a suitable precipitant and further processed, if desired. The loaded organic goes through a number of scrubbing stages and then passes to a number of stages of mixer-settler stripping units wherein yttrium and the heavier rare earths are stripped from the organic phase by proper adjustment of the $H^+$ concentration, e.g., with nitric acid. The heavy fraction is taken off for processing in the ion exchange columns and the organic is regenerated and recycled for reuse as the organic phase.

The heavy fraction in the form of a nitrate solution is then diluted, if necessary, and becomes the rare earth feed for the ion exchange columns. In the ion exchange process, the rare earth feed is loaded on the cation exchange resin, washed and eluted with a solution of an ammonium salt of hydroxyethylethylenediaminetriacetic acid (hereafter referred to as HEDTA) as the complexing agent. The ability to use HEDTA as the complexing agent is especially important since the yttrium will separate between neodymium and samarium rather than between dysprosium and terbium as is the case when ethylenediaminetetraacetic acid (EDTA) is used as the complexing agent. Therefore, after the heavy rare earths are cut from the ion exchange columns, all that remains is the yttrium since neodymium and the lighter rare earths are not in the heavy fraction obtained from the solvent extraction process. Thus, the remaining columns can be quickly and efficiently stripped, e.g., with ammonium acetate, to recover the pure yttrium. Also, the HEDTA can be regenerated for reuse as the complexing agent further enhancing the economies of the operation.

In order that those skilled in the art may better understand the process of the present invention, examples of the operation to extract yttrium are given below.

EXAMPLE 1

Figure 1:
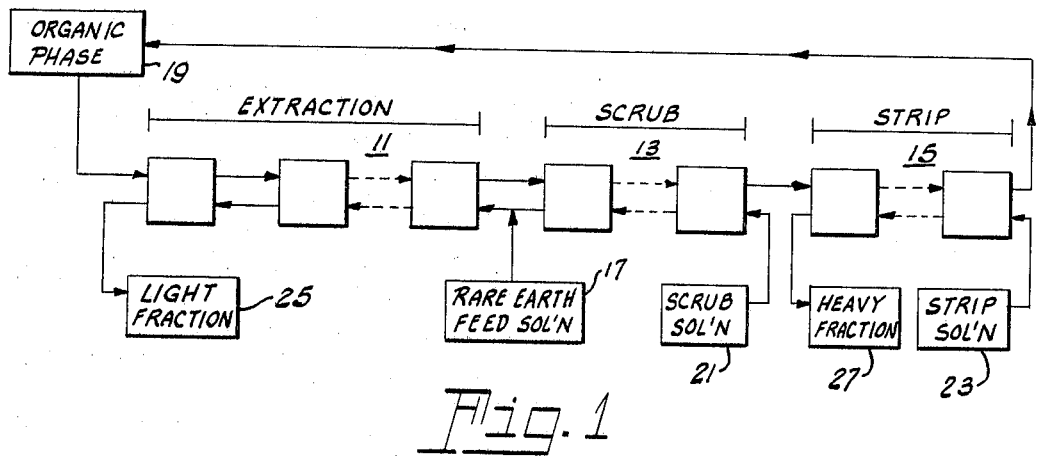
FIG. 1 is a flow diagram of the solvent extraction process according to the invention.

For the solvent extraction portion of the process with reference to the flow diagram of FIG. 1, nine mixer-settler units were used for extraction 11, four mixer-settler units for scrub 13 and three mixer-settler units for stripping 15. On a laboratory basis, Pyrex mixer-settler units having a mixer volume of 130 ml. and a settler volume of 300 ml. were used with air-driven stirrers to provide the mixing and Brosites proportioning pumps to provide steady flow rates. All connections were made with Pyrex or Tygon tubing and ordinary glass jugs were used as reagent reservoirs. The rare earth (including yttium) feed solution 17 contained from 20 to 40 grams per liter of yttrium and rare earth oxides in a nitric acid solution having a pH of 1.5 to 2.0. The organic phase 19 consisted of 88% by volume commercial grade kerosene as carrier, 5% by volume normal hexanol as solubilizer and 7% by volume of monoesters and diesters of tridecyl orthophosphoric acid (the latter obtainable under the trade designation tridecyl acid phosphate from the Stauffer Chemical Company; the acid contains approximately equal molar proportions of the mono- and di-substituted acid, is prepared from tridecyl alcohols, has an average molecular number of 371, a density of .97 and an acid number of 227). The scrub solution 21 was a nitric acid solution having a pH of 1.5 to 2.0, and the strip solution 23 was a 1.5 normal nitric acid solution. The flow rates for the system were as follows: organic feed at 21.0 ml./min.; rare earth feed at 3.5 ml./min.; scrub solution at 8.4 ml./min.; and strip solution at 21.0 ml./min. Once the system was operating in balance, runs were made including the collection of the light fraction 25 as well as the heavy fraction 27.

Using this process the yttrium recovery in the heavy fraction was in excess of 99% and the heavy fraction contained less than 0.02% neodymium.

EXAMPLE 2

Essentially the same as the process of Example 1 except for greatly expanded capacity, the mixer-settler units have approximately a fifty gallon capacity. The stages are again connected in cascade with the organic stage moving by gravity and the aqueous phase is made to flow counter-currently by interstage pumping. The organic phase, rare earth feed, scrub solution and strip solution have approximately the same concentration as in Example 1; however, the expanded flow rates are as follows: Organic at 6 liters/minute; rare earth feed at 1 liter/minute; scrub solution at 2.4 liters/minute; and the strip solution at 6 liters/minute. The organic/aqueous phase ratio is maintained at approximately 1.765/1 for extraction and 1/1 for stripping.

EXAMPLE 3

For the ion exchange portion of the process, seven columns, six of which are 36" in diameter and one of 18" diameter are used. The resin bed in each column is approximately seven feet long. The first two columns initially are in the ammonium ion ($NH_4^+$) cycle, the third is in the rare earth cycle and the fourth, fifth and sixth in $H^+$ cycle. Feed, consisting of the heavy fraction from the solvent extraction process plus an equal volume of deionized water, is pumped at a rate of approximately two gallons per minute through the first column and the eluent from the first column is monitored for rare earths. When the rare earths appear in the eluent, the second column is connected in series with the first column and similarly monitored for rare earths. As rare earths appear in the eluent from the second column, the eluent is recycled to the feed tanks, with the recycling continued for about six hours. Then, the feed input is stopped and deionized water is pumped through the columns at a rate of about two gallons per minute for approximately six hours to rid the column train of excess rare earths.

Next, the third and fourth columns are connected in series to the train and an ammonium salt of HEDTA is fed to the first column in the series at a rate of two gallons per minute. The eluent from the fourth column is monitored for HEDTA, and, when it is noted, the eluent is reclaimed and monitoring for rare earths begins. The fifth column is added in series when the rare earths appear at the bottom of the fourth column and HEDTA monitoring begins on the eluent from the fifth column. When detected, the HEDTA is again reclaimed. Then, when rare earths are detected in the eluent from the fifth column, the sixth column is connected in series and the flow rate is reduced to one gallon per minute with the eluent from the sixth column being monitored for HEDTA. When detected, the HEDTA is reclaimed and monitoring for the rare earths begins.

As each column is added, the eluent from the first column in the series is also monitored for rare earths and, when no rare earths are detected, that column is removed from the train and the HEDTA feed is connected to the next column in the train.

Typically, the elution is carried on for about one and an eighth band lengths after which the heavy rare earths and the overlapping yttrium band are collected on the seventh column for recycle. This means that only the yttrium remains in the columns, since the lighter rare earths were removed during the solvent extraction process. Thus, it becomes relatively simple to rapidly strip the remaining columns, e.g., using ammonium acetate, to recover the highly pure yttrium material.

The purity of the recovered yttrium material is >99.9% and, using the foregoing techniques, the total processing time is reduced to less than twenty days as compared to 45 to 60 days using the prior art techniques. Also, with the process of the present invention, the light fraction from the solvent extraction process and the heavy cut from the ion exchange columns can be further processed to recover other rare earth elements, thereby further enhancing the economies of the system.

It is to be understood that the foregoing examples are given to illustrate the process of the invention and are not meant to be limiting since those skilled in the art will readily recognize numerous modifications and variations which can be made within the spirit and teaching of the invention. For example, the solvent extraction process was described with the organic phase utilizing a kerosene carrier containing a hexanol solubilizer, but it is recognized that aromatic hydrocarbons can be used, e.g., benzene can be used as the carrier and would require no solubilizer. Obviously, many different combinations of carrier and solubilizer can be used. In general, the organic phase must have low viscosity, must not adversely affect separation and must have a high flash point.

It is therefore apparent that applicant has provided an improved process for the recovery of relatively pure yttrium materials which is significantly faster than prior art techniques, thereby effectively increasing the capacity of the system resulting in added economic benefits.

I claim:
1. A process for extracting yttrium from a feed solution containing elements of the lanthanide series comprising the steps of:
   processing said feed solution through a liquid-liquid counter-current solvent extraction system having aqueous and organic phases to separate the lighter elements of the lanthanide series into the aqueous phase and to separate yttrium and the heavier elements of the lanthanide series into the organic phase wherein said organic is selected from the group consisting of monoesters and diestters of tridecyl orthophosphoric acid;
   recovering the yttrium and the heavier elements of the lanthanide series from the organic phase of the solvent extraction system; and
   processing of the recovered yttrium and the heavier elements of the lanthanide series through an ion exchange column system to effect separation of the yttrium from the heavier elements of the lanthanide series comprising the steps of:

passing an aqueous solution containing yttrium ions and ions of the heavier elements of the lanthanide series through an ion exchange resin adapted to absorb said ions, thereby charging said ion exchange resin with absorbed ions;

passing a solution of an ammonium salt of hydroxyethylethylenediaminetriacetic acid as a complexing agent adapted to form complexes with said yttrium and the heavier elements of the lanthanide series through said charged ion exchange resin so as to form an eluate containing complexes of said complexing agent and said yttrium and lanthanide elements;

collecting said eluate containing the heavier elements of the lanthanide series; and stripping said ion exchange resin to recover the purified yttrium therein remaining.

2. A process according to claim 1 wherein said feed solution contains from 20 to 40 grams per liter of yttrium and lanthanide series oxides and wherein the processing of said solution through a liquid-liquid counter-current solvent extraction system comprises the steps of: contacting said feed solution with an organic solution containing monoesters and diesters of tridecyl orthophosphoric acid as an active organic reagent to effect separation of the lighter elements of the lanthanide series into the aqueous phase and the heavier elements of the lanthanide series including yttrium into the organic phase; and separating the organic phase from the aqueous phase.

3. A process according to claim 2 wherein said organic solution consists of about 88% by volume commercial grade kerosene, 5% by volume normal hexanol and 7% by volume monoesters and diesters of tridecyl orthophosphoric acid.

4. A process according to claim 1 wherein the stripping of said ion exchange resin to recover the yttrium therein remaining utilizes ammonium acetate as the stripping agent.

References Cited

UNITED STATES PATENTS

| 2,956,858 | 10/1960 | Spedding et al. | 23—22 |
| 3,037,841 | 6/1962 | Kumholz | 23—23 |
| 3,110,556 | 11/1963 | Peppard et al. | 23—23 |

OTHER REFERENCES

Gump et al.: "Abstract of Papers, 152nd Meeting, American Chemical Society," Sec. O, Abstract 97, published by American Chemical Society, Washington, D.C.

Morton et al.: "Journal of Inorganic and Nuclear Chemistry," vol. 29, 1967, pp. 2997–3001.

HERBERT T. CARTER, Primary Examiner

U.S. Cl. X.R.

23—23; 260—429.2